(12) United States Patent
Yamada

(10) Patent No.: US 7,702,076 B2
(45) Date of Patent: Apr. 20, 2010

(54) LINEAR X-RAY LASER GENERATOR

(75) Inventor: Hironari Yamada, 4-2-1 (808), Takagai-cho minami, Omihachiman-shi, Shiga (JP) 5230898

(73) Assignees: Hironari Yamada, Shiga (JP); Photon Production Laboratory, Ltd., Shiga (JP)

( * ) Notice: Subject to any disclaimer, the term of this patent is extended or adjusted under 35 U.S.C. 154(b) by 29 days.

(21) Appl. No.: 12/071,809

(22) Filed: Feb. 26, 2008

(65) Prior Publication Data

US 2008/0219297 A1 Sep. 11, 2008

Related U.S. Application Data

(63) Continuation of application No. PCT/JP2005/018345, filed on Oct. 4, 2005.

(30) Foreign Application Priority Data

Sep. 12, 2005 (JP) ............................. 2005-264316

(51) Int. Cl.
*H01S 4/00* (2006.01)
(52) U.S. Cl. .......................................... 378/119; 372/5
(58) Field of Classification Search .................. 378/84, 378/119–144; 372/5
See application file for complete search history.

(56) References Cited

U.S. PATENT DOCUMENTS 5,107,508 A    4/1992  Piestrup ........................... 372/5

5,814,821 A    9/1998  Reusch et al. ............ 250/492.3

FOREIGN PATENT DOCUMENTS

| JP | 08-195300 | 7/1996 |
|---|---|---|
| JP | 2000-058300 | 2/2000 |
| JP | 2004-087803 | 3/2004 |

OTHER PUBLICATIONS

Netze, R. et al., "Potential for biomolecular imaging with femtosecond X-ray pulses," Nature, vol. 406, Aug. 17, 2000, pp. 752-757. (Mentioned on p. 1 in the Specification).

Yamamoto, Shigeru et al., "Construction of Two New In-vacuum Type Tapered Undulators for the new PF-AR," CP705, *Synchrotron Radiation Instrumentation: Eighth International Conference*. American Institute of Physics (2004) pp. 235-238 (Mentioned on p. 1 in the Specification).

The International Search Report issued Jan. 10, 2006 in corresponding international patent application No. PCT/JP2005/018345.

(Continued)

*Primary Examiner*—Courtney Thomas
(74) *Attorney, Agent, or Firm*—Posz Law Group, PLC

(57) ABSTRACT

A small X-ray laser generator including a device (1) for generating and accelerating an electron beam, a plurality of targets (2) placed on the transport trajectory of a generated electron beam (4), and X-ray mirrors (3) for monochromatizing X-rays (5) generated by making the electron beam (4) collide against the plurality of targets (2), in which the X-rays (6) generated from the respective targets (2) are made to interfere with each other to produce a hard X-ray laser beam of 1 keV or more.

7 Claims, 3 Drawing Sheets

OTHER PUBLICATIONS

A. E. Kaplan, et al., "Extreme-Ultraviolet and X-Ray Emission and Amplification by Nonrelativistic Electron Beams Traversing a Superlattice," *Applied Physics Letters*, AIP, American Institute of Physics, vol. 44, No. 7, Apr. 1, 1984, pp. 661-663.

M. Piestrup, et al., "The Prospects of an X-Ray Free Electron Laser Using Stimulated Resonance Transition Radiation," *IEEE Journal of Quantum Electronics*, vol. QE-19, No. 3, Mar. 1, 1983, pp. 357-364.

Extended European Search Report dated Oct. 14, 2009 issued from the European Patent Office in the corresponding European patent application No. 05790527.5— 2222.

LINEAR X-RAY LASER GENERATOR

TECHNICAL FIELD

The present invention relates to an industrial field of generating and using radiation. The present invention also relates to an industrial field of producing and using a particle accelerator.

BACKGROUND ART

A method comprising placing tiny targets on an electron trajectory of a tabletop synchrotron, invented by Hironari Yamada, is known as an X-ray generating system. This method generates a high-brilliance, hard X-ray by using low-energy electrons in the range of several MeV to several tens of MeV. However, the obtained X-ray has a low coherence and is not a laser beam. Another known method comprises generating a GeV-level electron beam and passing the electron beam through an undulator to generate a relatively high-coherence X-ray. However, the apparatus is extremely large, and it is difficult to generate a short-wavelength X-ray of 1 keV or more. Another known method comprises generating a plasma in the form of a very narrow channel to produce an X-ray laser beam, and the method generates an X-ray of about 1 keV. A photon storage ring laser invented by Hironari Yamada, which comprises an annular mirror placed around an exactly circular electron orbit of an exactly circular synchrotron to make the generated synchrotron light and an electron beam interact with each other, is also known. However, it is difficult to produce an X-ray using the photon storage ring laser.

Patent Document 1: Japanese Unexamined Patent Publication No. 08-195300.
Patent Document 2: Japanese Unexamined Patent Publication No. 2000-058300.
Non-patent Document 1: Netze, R., Wouts R., van der Spoel D., Weckert E., and Hajdu, J., Nature 406,752 (2000).
Non-patent Document 2: S. Yamamoto, K. Tsuchiya, and T. Shioya, Construction of two new in-vacuum type tapered undulators for the PF-AR, in press, the Proc. of the Eighth International Conference on Synchrotron Radiation Instrumentation (2003).

DISCLOSURE OF THE INVENTION

Problems to be Solved by the Invention

The technology to generate a high-intensity X-ray laser beam, i.e., a hard X-ray laser beam with an energy of about 1 keV or more has not been put into practical use. Although several methods have been tried in the 1 keV region, the apparatus is large and is not likely to be put into practical use. An object of the present invention is to generate a hard X-ray laser beam of 1 keV or more by using a small apparatus.

Means for Solving the Problem

As a means for achieving the object, the present invention provides an X-ray laser generator comprising: a device for generating and accelerating an electron beam; a plurality of targets disposed on the transport trajectory of the generated electron beam; and a mechanism for monochromatizing a generated X-ray by making the electron beam collide with the plurality of targets. The X-rays generated from the respective targets and monochromatized are made to interfere with each other to generate an X-ray laser beam.

In one embodiment of the X-ray laser generator, the targets are selected from the group consisting of multilayer films, diffraction gratings, and crystals.

In one embodiment of the X-ray laser generator, an X-ray mirror is provided in a position not on the transport trajectory of the electron beam to make the generated X-rays interfere with each other.

In one embodiment of the X-ray laser generator, a mechanism for rotating and moving the targets in parallel is provided to select an X-ray wavelength and make the X-rays of that wavelength interfere with each other.

In one embodiment of the X-ray laser generator, an X-ray mirror provided in a position not on the transport trajectory of the electron beam can be changed in position.

In one embodiment of the X-ray laser generator, a magnet for delaying the passage of the electron beam is provided to synchronize the X-rays and the electron beam.

In one embodiment of the X-ray laser generator, a magnet for changing the trajectory of the electron beam is provided to separate the generated X-rays and the electron beam from each other.

In one embodiment of the X-ray laser generator, a quadrupole magnet for focusing the electron beam on the position of a target is provided on the transport trajectory of the electron beam to enhance the interference between the X-rays and the electron beam.

Effect of the Invention

The X-ray laser generator of the invention makes an electron beam collide against crystal targets, so that monochromatic light can be directly generated in predetermined directions. Furthermore, the X-ray laser generator of the invention makes monochromatic X rays generated from a plurality of crystal targets interfere with each other to enhance coherence. Moreover, the X-ray laser generator of the invention directs the electron beam and the generated highly coherent X-rays into the target at the same phase velocity to thereby induce stimulated emission of X-ray radiation in the target. Based on the above principle, the X-ray laser generator of the invention has the following advantages, compared to known X-ray laser generators. First, a very high-intensity X-ray laser can be provided. Secondly, an X-ray laser beam of 1 keV or more can be provided. Thirdly, an X-ray wavelength can be selected by a simple operation of selecting a crystal, diffraction grating, or multilayer film and changing the rotation angle thereof. Furthermore, fourthly, the X-ray laser generator of the invention is small, so it can be used for general purposes. Of course, the X-ray laser generator of the invention can easily produce low-energy X-rays and EUV light.

DESCRIPTION OF THE REFERENCE NUMERALS

Figure 1:
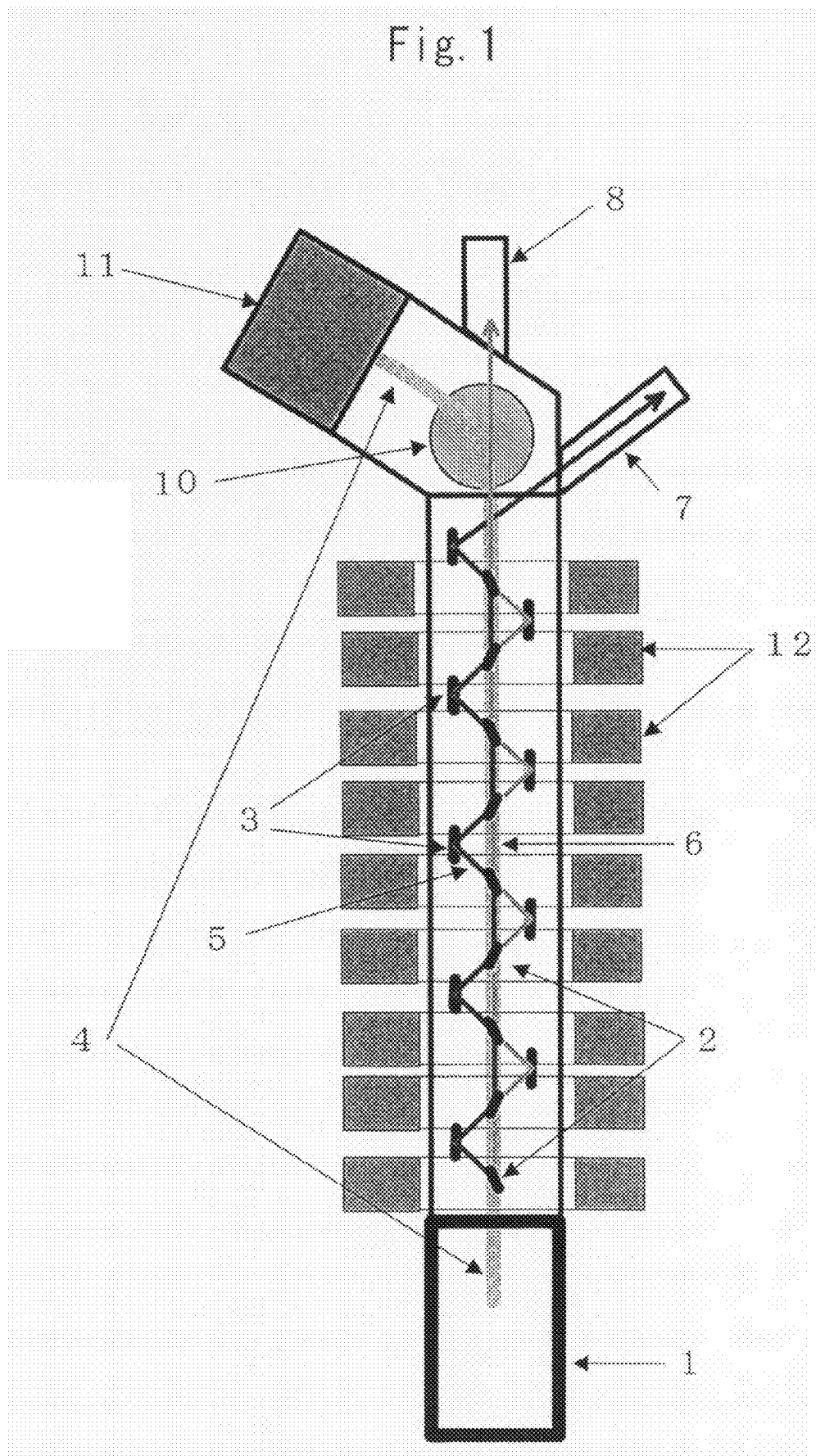
FIG. 1 is a sectional view showing the structure of a linear X-ray laser generator of the invention.

1: Electron beam generation accelerator
2: Target
2': Target
3: X-ray mirror
4: Electron trajectory
5: X-ray
6: X-ray
7: Port 8: Port
10: Magnet
11: Damper
12: Quadrupole electromagnet
13: Meandering electron trajectory
14: Magnet for causing the electron beam trajectory to meander.

BEST MODE FOR CARRYING OUT THE INVENTION

Embodiments of the invention are described below in detail with reference to the accompanying drawings.

EXAMPLES

The configuration of the X-ray laser generator of the invention is described in detail with reference to FIG. 1. As shown in FIG. 1, the X-ray laser generator comprises: an electron beam generation accelerator 1; a plurality of targets 2 placed on an electron trajectory 4; an X-ray mirror 3 for returning X-rays generated from the respective targets 2 to the electron trajectory 4; a magnet 10 for separating the electron beam from the generated X-ray beam; a damper 11 for discharging the electron beam; and ports 7 and 8 for emitting the X-ray beam. The electron beam generation accelerator 1 is preferably a linac or microtron. A betatron, synchrotron, electrostatic accelerator, or the like may also be used as the electron beam generation accelerator 1. The electron energy is preferably in the range of at least 1 MeV and not more than 8 MeV. The electron energy may be out of this range. Preferable materials for the targets 2 are crystals, such as diamond and Si. The thickness of the crystals is preferably about several tens of μm to about 0.1 mm. A thickness of about 1 mm is also possible. The width of the crystals is several millimeters to several centimeters because each of the crystals should cover the cross section of the electron beam. Diffraction gratings are preferable to produce low-energy X-rays and ultraviolet rays. When multilayer films are used, the layer cycle can be manually selected, so that the positions of the targets 2 and X-ray mirror 3 can be more freely arranged.

Figure 3:
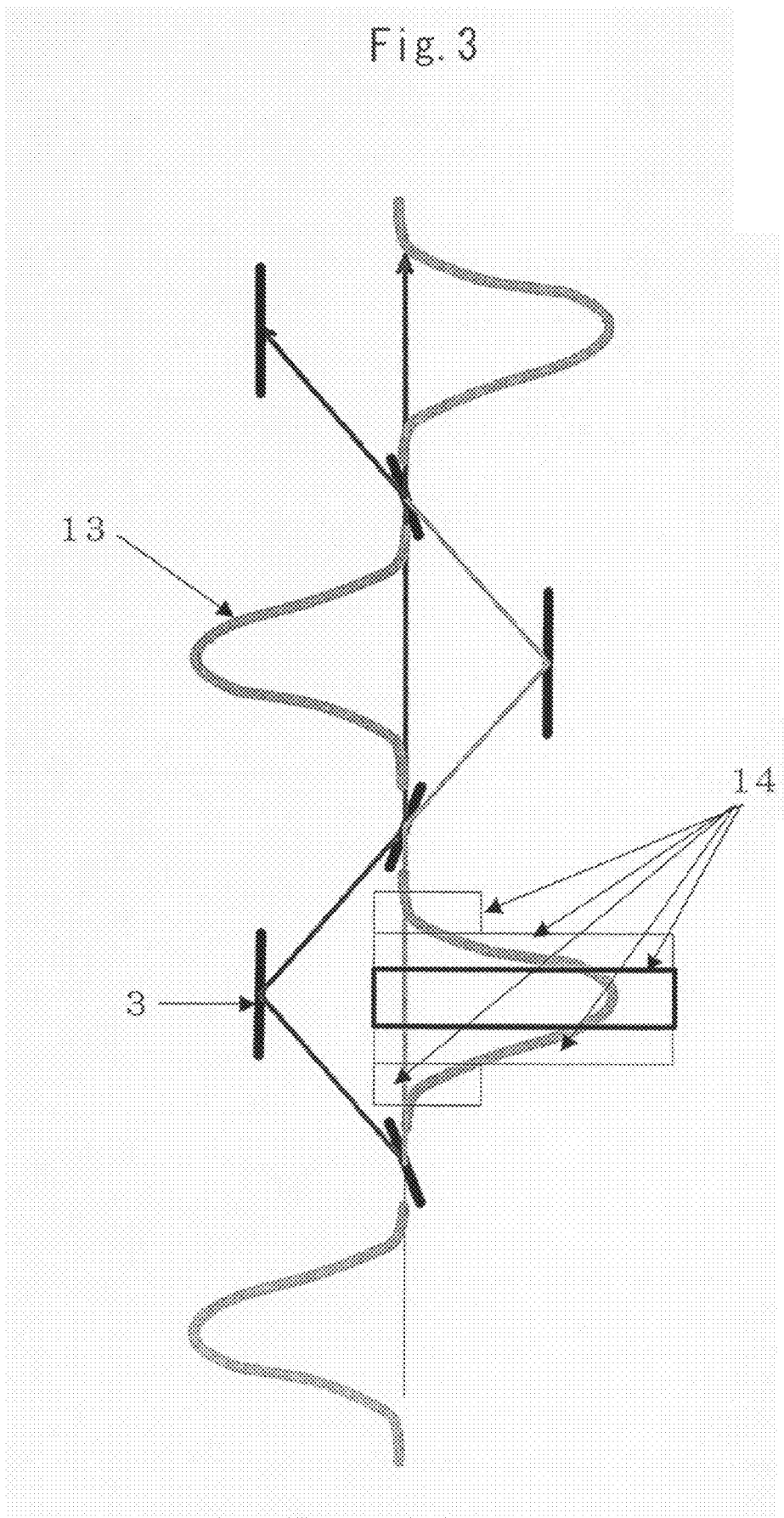
FIG. 3 illustrates the mechanism for adjusting the passage of an electron beam by causing the electron beam to meander.

In this embodiment, the trajectory of the electron beam is linear. It is also possible to cause the trajectory of the electron beam to meander as shown in FIG. 3. The length of the trajectory of the electron beam may be in the range of 1 to 10 m. The distance can be selected considering the desired intensity of the X-ray to be obtained.

To prevent dispersion of the electron beam at the time of electron beam transportation, quadrupole magnets 12 are preferably provided. To prevent dispersion of the electron beam by collision thereof against the targets 2, quadrupole magnets 12 are preferably provided in positions corresponding to the positions of the targets 2. However, such quadrupole magnets 12 may not be provided or may be provided in positions not corresponding to the positions of the targets 2.

The targets 2 are arranged at regular intervals along the electron trajectory 4. The theory for selecting the interval length will be described in the next section. When crystals are used as the targets, the face of the crystal is inclined at a predetermined angle with respect to the electron flow direction. The angle of inclination is selected, based on the lattice number of the crystal surface and the wavelength of the monochromatic X ray to be obtained.

Figure 2:
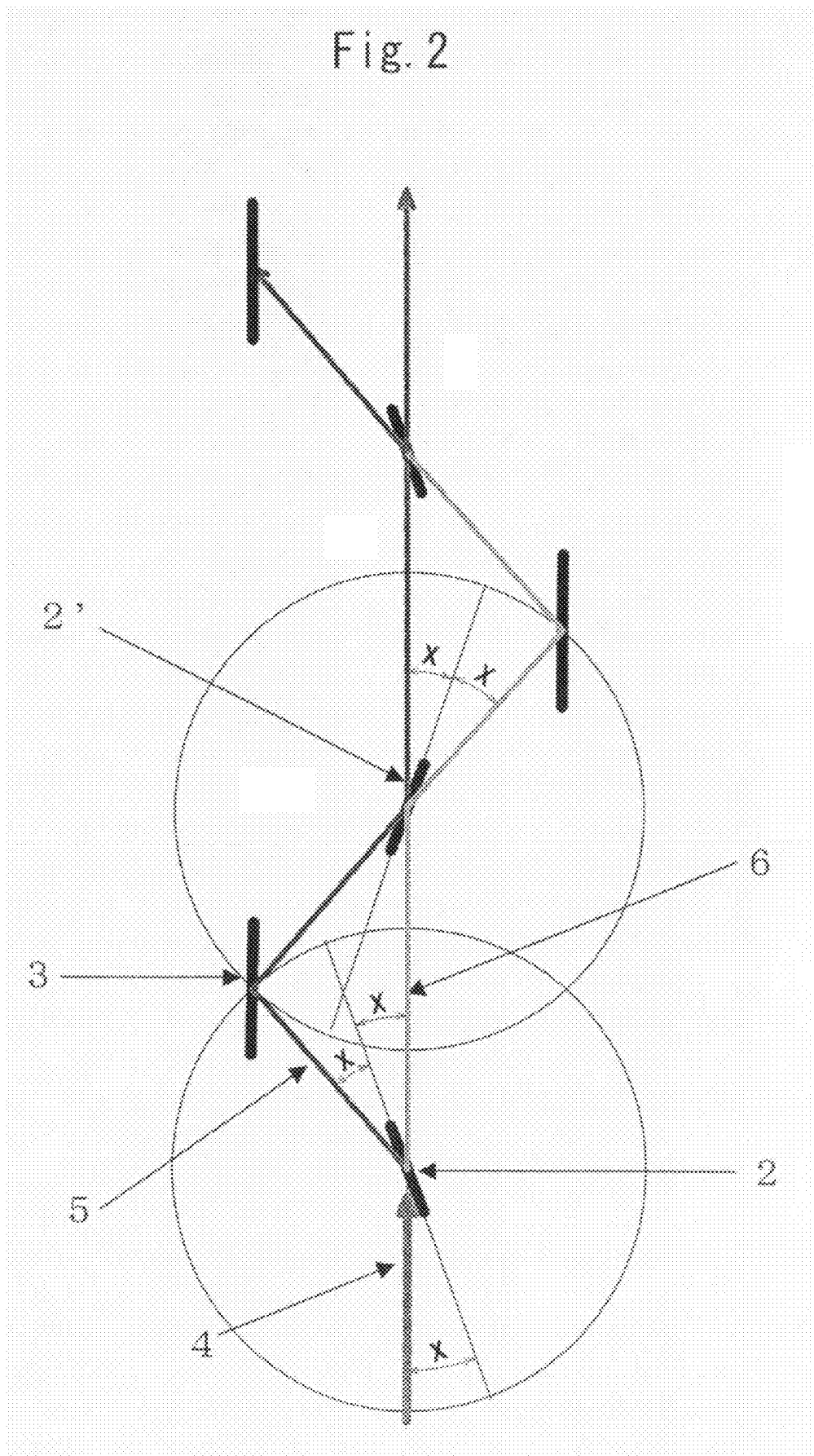
FIG. 2 illustrates the mechanism for generating highly coherent monochromatic X-rays.

Next, the mechanism for generating a highly coherent monochromatic X-ray beam is described in detail with reference to FIG. 2. The case where crystals are used as the targets 2 is described, while not taking the reflection by X-ray mirror 3 into consideration. When the electron beam collides against the target crystal 2 along the electron trajectory 4, a bremsstrahlung X-ray is produced and immediately diffracted by the crystal. The crystal surface is inclined at an angle of −X with respect to the electron beam. More specifically, the electron beam is directed onto the crystal surface at an angle of incidence X. Electron beam is emitted at the same angle as the angle of incidence X with respect to the crystal face but diffraction occurs in the + and − directions. The wavelength of the X-ray to be diffracted is specified according to the lattice number of crystal and the angle of incidence. An X-ray with a specific wavelength is diffracted in two directions symmetrical with respect to the crystal surface and radiated as X-rays 5 and 6. The relationship among the lattice number of crystal, the angle of incidence, and the wavelength can be given by the well-known Bragg's law. For example, when an electron beam is directed onto a Si (220) surface at an angle of incidence of 14.75°, a 12.7 KeV X-ray is diffracted. As a result, the X-ray 6 propagates in the same direction as the electron beam flow direction. More specifically, the diffracted X-ray 6 propagates at a velocity similar to that of the electron beam in the same direction as the electron beam transmitted through target 2, and collides against the next target 2'. The crystal 2' is provided at an angle of rotation of +X with respect to the electron beam flow direction. Therefore, the X-ray 6 propagated in the electron beam flow direction is diffracted again in the directions of ±X with respect to the crystal surface. Of course, the X-ray generated by collision of the electron beam against the target 2' is also diffracted in the directions of ±X. Furthermore, the generated X-ray and the propagated X-ray are almost in the same phase. More specifically, the newly generated X-ray and the propagated X-ray interfere with each other to enhance the intensity. The crystal targets are periodically placed successively in the electron flow direction at alternate angles of inclination of +X and −X. Therefore, a monochromatic X-ray is generated continuously in the electron flow direction, and the generated X-ray interferes with the propagated X-ray.

According to the above principle, as long as the electron beam and the X-ray beam have the same phase velocity, the targets 2 may be placed in almost any positions. Furthermore, the number of targets 2 is not limited. However, there is an optimum number of targets to be placed so as to obtain an specific X-ray energy, because the generated X-rays are absorbed by the targets 2. To obtain a 10 keV X-ray, the total thickness of the targets through which the X-ray passes is preferably about 1 mm. For example, when the thickness of one target is 10 μm, about 100 layers of the target makes a total thickness of about 1 mm.

When the electron energy is low, i.e., 100 MeV or less, the electron velocity is not the velocity of light, so that a phase difference occurs between the electron beam and the X-ray. In this case, the targets 2 are placed in such positions that the phase difference becomes an integral multiple of the X-ray wavelength λ. When using an electron beam with a β (ratio of electron velocity to light velocity) of 0.999999 (361 MeV, calculated on an energy basis), the electron beam is delayed by 10 nm when the light travels 10 mm. Therefore, when targets are placed at intervals of 10 mm or at intervals of an integral multiple of 10 mm to obtain an X-ray with a wavelength of 10 nm, an X-ray with a long coherence length can be obtained. Of course, higher harmonics, e.g., X-rays with wavelengths of 1 nm and 0.1 nm, are also generated. By precisely placing the targets at intervals of 1 mm, an X-ray with a wavelength of 1 nm and higher harmonics can be produced.

As described above, the X-ray laser generator according to the first embodiment of the invention comprises crystals, diffraction gratings, or multilayer films provided in specific positions on a linear electron trajectory. In this embodiment, a reflecting mirror 3 is not an essential requirement. To produce a short wavelength, a comparatively high electron energy is preferable.

As a second embodiment, the principle of the use of an X-ray mirror 3 for reflecting X-rays (hereinafter also referred to as a "reflecting mirror") to increase the X-ray intensity and induce stimulated emission of X-ray radiation is described below in detail.

When a reflecting mirror 3 is used, amorphous substances can also be used as the targets 2. More specifically, when the reflecting mirror 3 is placed in such a position that the phase of the X-ray monochromatized and reflected by the reflecting mirror 3 matches with the phase of the electron beam at the position of a target 2, the X-ray intensity can be further increased by interference. Furthermore, the reflecting mirror 3 can induce the stimulated emission of X-ray radiation from the electron beam. Of course, the use of crystals or multilayer films as the targets 2 is more efficient. Therefore, such a case is described below.

The reflecting mirror 3 is placed so as to reflect and direct the propagated X-ray 5 into a crystal 2' at the same angle of incidence X. Therefore, diffracted lights also propagate in the directions of ±X. Therefore, the X-ray reflected by the reflecting mirror 3 and diffracted also has a component that propagates in the electron moving direction. The material of the X-ray mirror 3 must reflect a specific monochromatic X-ray. Therefore, a total reflection mirror is preferably used. However, when the angle of incidence is large, the reflectance of high energy X-rays is low. Therefore, specific crystals or multilayer coating are preferably used.

In the second embodiment, the positions in which the target 2 and X-ray mirror 3 are placed are described below. There are some rules for enhancing the X-ray coherence. The first is the condition under which the phase of the X-ray propagating from the target 2 to the target 2' via the X-ray mirror 3 matches with the phase of the X-ray 6 that propagates straight. To meet these conditions, the position of the X-ray mirror 3 is preferably adjusted in such a manner that both the optical path length from target 2 to target 2' via X-ray mirror 3 and the optical path length from target 2 to target 2' become integral multiples of the wavelength of the X-ray to be obtained. The second condition is the positioning of an X-ray mirror 3 in such a position that an X-ray that has been reflected by the X-ray mirror 3 and reached the target 2' securely encounters a bunch of electrons in the electron beam. The optical path length from target 2 to target 2' via X-ray mirror 3 is always longer than the optical path length from target 2 to target 2'. Therefore, the generated X-ray does not encounter the same bunch of electrons that generated the X-ray, but can be arranged to encounter a subsequent bunch of electrons. Of course, one method of easily adjusting the timing of the encounter comprises causing the electron beam to meander between the target 2 and target 2' using a plurality of magnets 14 as shown in FIG. 3 to thereby delay the time of the electron beam's arrival at the target 2'. In FIG. 2, such magnets are not shown.

Any electron beam produced by a linac or microtron accelerator has a bunched structure, and micro-pulses are produced. For example, when a 2.5 GHz linac is used, the bunch interval is about 6 cm. For example, one solution is to place targets at an interval between adjacent targets of 13 cm, and positioning a reflecting mirror 3 about 7.9 cm away from the electron trajectory. There are many other solutions. When the electron beam has a low energy, these distances may be modified, taking into consideration that the electron phase velocity is not the velocity of light.

The X-ray having passed through a plurality of targets 2 and X-ray mirror 3 thus arranged is emitted in directions along the ports 7 and 8 of FIG. 1. The X-ray obtained in the direction along the port 8 is a mixture of a monochromatic X-ray and a white bremsstrahlung X-ray. Therefore, to obtain the monochromatic X-ray, it is necessary to insert an X-ray mirror 3 or an appropriate crystal. The monochromatic X-ray is obtained in the direction along port 7.

In the above description, the X-ray laser generator of the invention generates a monochromatic, highly coherent light by using crystals or multilayer films as targets. The process of amplification is not described. This would mean that the X-ray intensity simply increases in proportion to the number of targets. Amplification does not occur due to the presence of crystal targets or the presence of the X-ray mirror.

However, in reality, stimulated emission of X-ray radiation is induced by in-phase electromagnetic waves produced by highly coherent X-rays. When an electron beam passes close to the nucleons of a target, the electron beam is bent to emit photons. Bremsstrahlung occurs by this process. When an electromagnetic wave is present in such a field created by electrons and nucleons, stimulated emission of X-ray radiation is induced. This is similar to a usual laser in which stimulated emission is induced by introducing an electromagnetic wave into an atom in a population inversion state produced by exciting the atom. The electrons of-the incident electron beam behave as if they were orbital electrons that go around an atomic nucleus. High-energy electrons passing close to an atomic nucleus can be considered to be in an excited state capable of emitting an X-ray at any time and produce a population inversion. When an electromagnetic wave is introduced into the atom in the population inversion state, stimulated emission of an electromagnetic wave of that wavelength is induced. The phenomenon of white X-ray radiation via bremsstrahlung emissions can be explained as follows. Electrons are considered to occupy continuous energy levels in the potential created by an atomic nucleus, and one electron occupying a certain level in the continuous energy levels resonates with an incident X-ray of a specific wavelength. Moreover, because the electromagnetic wave and the electron beam propagate at the same phase velocity, there is a high probability of inducing stimulated emission. Such an amplification process is also similar to free electron lasers. In a free electron laser, an electron beam is bent using magnets to produce white light. The energy levels of electrons captured by the magnets are also considered to be continuous. If a free electron laser is quantum-mechanically described, a monochromatic electromagnetic wave is introduced into such electrons in continuous energy levels to induce stimulated emission of radiation. In the X-ray laser of the invention, because the electron beam and light (X-ray) always arrive at the target exactly at the same phase, there is no need to consider micro-bunching of the electron beam.

Therefore, when an X-ray laser produced by the X-ray laser generator of the invention is saturated, the X-ray intensity is proportional to the square of the number of electrons. For example, when the number of electrons is $10^{10}$, the number of X-ray photons is $10^{20}$. This is a very large value, and is larger than those of known X-ray laser generators and X-ray laser generators that are currently planned.

The main structure and principle of the X-ray laser generator of the invention are described above, while the drive mechanisms of the targets and mirrors are not particularly described. The necessity of nanometer-level fine adjustment of the positioning and inclination of the targets is described above; the fine adjustment itself can be appropriately made using commercially available mechanisms produced by known techniques.

The device for causing the electron beam to meander as described above with reference to FIG. 3 comprises a plurality of magnets 14 that are different in intensity and polarity and arranged parallel to each other. The device has a mechanism for adjusting the magnetic force in such a manner that the arrival of the electron beam at the next target is delayed by the electron trajectory being caused to meander as denoted by reference number 13 to make the electron beam arrive at the target at the same time as the X-ray propagated via the X-ray mirror. Such a device can be produced by a known technique used in free electron lasers, etc. The plurality of magnets 14 may comprise electromagnets. Alternatively, the same effect can also be achieved by using permanent magnets, while the gap between magnetic poles is adjusted to change the magnetic force distribution. The device is more advantageous in that even when the electron energy is low, the electron beam and the X-ray can be precisely synchronized.

As described above in detail, the X-ray laser generator of the invention can easily produce an X-ray laser of 1 keV or more. Furthermore, a single wavelength can be easily selected by changing the positions and angles of crystals, diffraction gratings or multilayer films. Of course, light of 1 keV or less can also be produced.

INDUSTRIAL APPLICABILITY

The X-ray laser generator of the invention achieves higher performance than known X-ray laser generators. The X-ray laser generator of the invention is small and can be used for general purposes. Therefore, the X-ray generator of the invention can be widely used in the industrial field of generating and using radiation, and/or in the industrial field of producing and using a particle accelerator.

The invention claimed is:

1. An X-ray laser generator comprising: a device for generating and accelerating an electron beam; a plurality of targets placed on the transport trajectory of the generated beam; a mechanism for monochromatizing X-rays generated by making the electron beam collide against the plurality of targets, in which the X-rays generated from the respective targets and monochromatized are made to interfere with each other to produce an X-ray laser; and a mechanism for rotating and moving the targets in parallel to select one specific X-ray wavelength and make the X-rays to interfere with each other.

2. An X-ray laser generator according to claim 1 wherein the targets are selected from the group consisting of multilayer films, diffraction gratings, and crystals.

3. An X-ray laser generator according to claim 1 further comprising an X-ray mirror provided in a position not on the trajectory of the electron beam to cause the generated X-rays to interfere with each other.

4. An X-ray laser generator according to claim 3 wherein the X-ray mirror provided in a position not on the transport trajectory of the electron beam can be changed in position.

5. An X-ray laser generator according to claim 3 further comprising a magnet for delaying the passage of the electron beam to synchronize the X-rays and the electron beam.

6. An X-ray laser generator according to claim 1 comprising a magnet for changing the trajectory of the electron beam to separate the generated X-rays and the electron beam from each other.

7. An X-ray laser generator according to claim 1 comprising a quadrupole magnet for focusing the electron beam on the position of a target to enhance the interference between the X-rays and the electron beam, the quadruple magnet being provided on the transport trajectory of the electron beam.

* * * * *